United States Patent Office 3,414,751
Patented Dec. 3, 1968

3,414,751
SYNCHRONOUS ELECTRICAL MOTOR
Paul Andre Bossard, Cluses, France, assignor to Ets. Carpano & Pons, Cluses, France, a company
Filed Jan. 25, 1968, Ser. No. 700,568
Claims priority, application France, Feb. 27, 1967, 96,612
4 Claims. (Cl. 310—164)

ABSTRACT OF THE DISCLOSURE

A pulsating synchronous electric motor is made with a permanently magnetized rotor of high coercivity and a stator having a cylindrical coil carrying the inductive winding and a cage of stator poles formed by the assembly of two flanges mounted on the sides of the coil, two poles of the first flange having a given polarity penetrate in the cage and between them are disposed two poles of opposite polarity of the second flange, the arrangement of the stator poles being such that in the polar diagram of the motor the axes corresponding to the polar step of the rotor pass through the axes of symmetry of the poles of the first flange and by the axes of the spaces separating two consecutive poles of the second flange.

The present invention is concerned with single phased motors of the pulsating type, that is to say with motors comprising a single magnetic field producing element in which the metallic masses producing the flux are in no way influenced by secondary flux producing elements such as dephasing rings, for example.

In a pulsating synchronous motor in which the rotor acts, during starting, as a balance ready to be stressed as soon as the bobbin becomes energized, from a rest position corresponding to a magnetic equilibrium between the poles of the rotor and those of the stator, that is from a position of minimum reluctance, starting is possible only if two consecutive poles of the rotor are not exactly centered along two consecutive poles of the stator when the rotor is not turning. Under such conditions, the tangential magnetic attractions or repulsions are in effect nonexistant such that the couple on the shaft is zero.

Various means have already been proposed to assure the start of such synchronous motors: thus for example there has been provided asymmetries in the shape of the stator poles or there have been eliminated certain poles or parts of poles in order to make possible a tangential stressing.

French patents 1,265,217 and 1,452,846 illustrate well these constructions.

All these solutions have made possible the creation of self-starting motors but at the price of a reduction in a developed motor couple, in particular owing to the reduction in surface of the polar masses of the stator.

This motor comprises, as in known motors, a permanently magnetized rotor of high coercivity and a stator formed of an inductive coil surrounding the rotor and a cage of stator poles continuous to two flanges positioned on either side of the coil, within which between two poles of the first flange, of a given polarity, are positioned two poles of the second flange.

This motor differs from known motors in that the positioning of the stator poles is such that in the polar diagram, the axes corresponding to the polar step of the rotor pass to the axes of symmetry of the poles of one of the stator flanges and by the axes of the spaces between the two consecutive poles of the second flange.

In this manner, at no time, neither upon stopping nor in operation can the axes of two consecutive poles of the rotor find themselves in the presence of two full stator parts of different polarity.

The invention will be better understood by referring to the accompanying drawing which gives a schematic representation of one example thereof.

Figure 1:
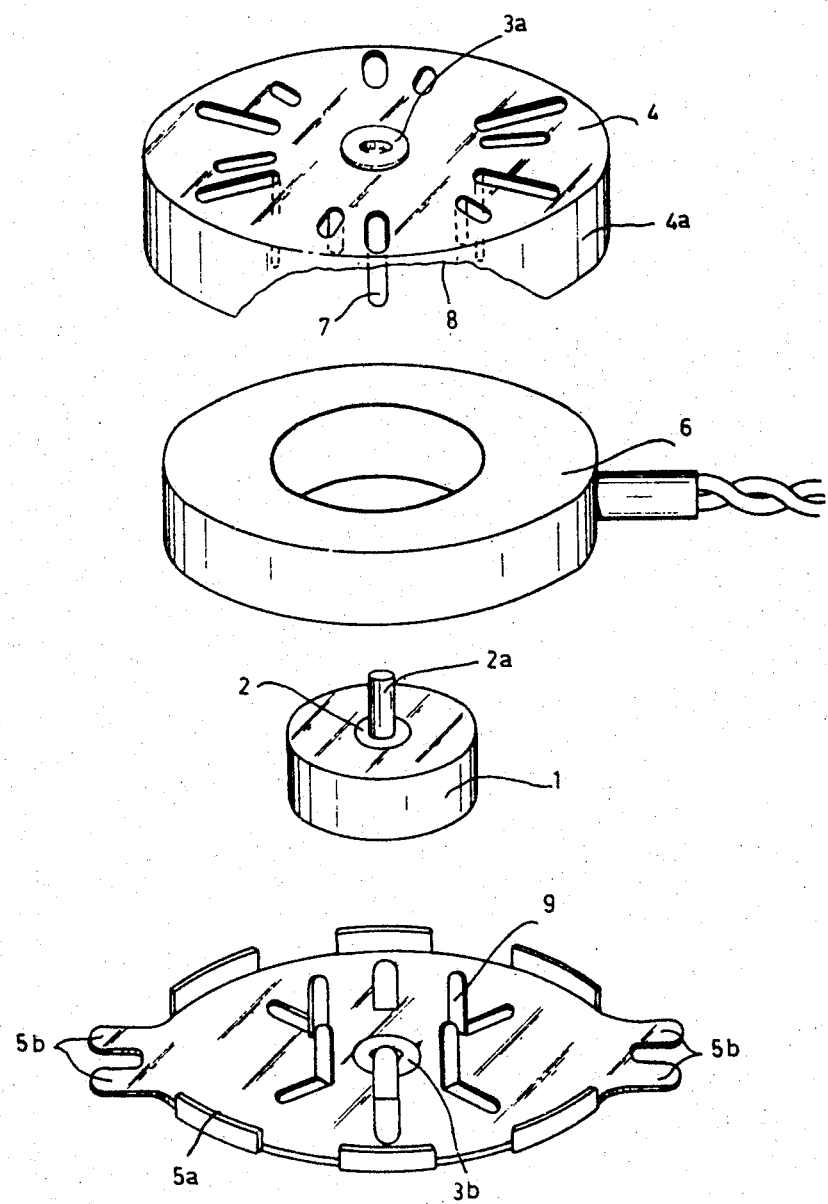
FIGURE 1 is an exploded view of the motor according to the invention.

The motor shown comprises (FIGURE 1) a rotor 1 constituted by a high coercivity permanent magnet, magnetized radially in such a way as to form twelve poles and secured by a thermoplastic moulding 2 on a shaft 2a which is pivoted on its extremities in bearings 3a and 3b of the central part of the two flanges 4 and 5.

These flanges form in effect the stator armature of the motor and surround an annular energizing coil 6 in the opening of which sits rotor 1. Flange 4 has a cylindrical skirt 4a by means of which it surrounds coil 6 and flange 5 having on its periphery legs 5a fitting in the opening of the skirt in the assembled position of the motor. Flange 5 has a pair of ears 5b extending in the extension one of the other, from pair to pair, and intended for securing the motor to any suitable support.

The flat part of flange 4 is embossed in order to form twelve poles grouped by pair and of a different length of pole to pole of the same pair. The longer poles have a length corresponding to the width of the rotor and the others have a length equal to half this width. Naturally the stamping made in flange 4 will be made in such a way that the various poles thus obtained extend circularly around rotor 1, once the motor is assembled. These poles are referenced 7 and 8 in the drawing.

Flange 5 is also stamped so as to obtain six poles 9 equidistantly disposed on a circle of a diameter corresponding to that on which are located poles 7 and 8 of flange 4.

Figure 2:
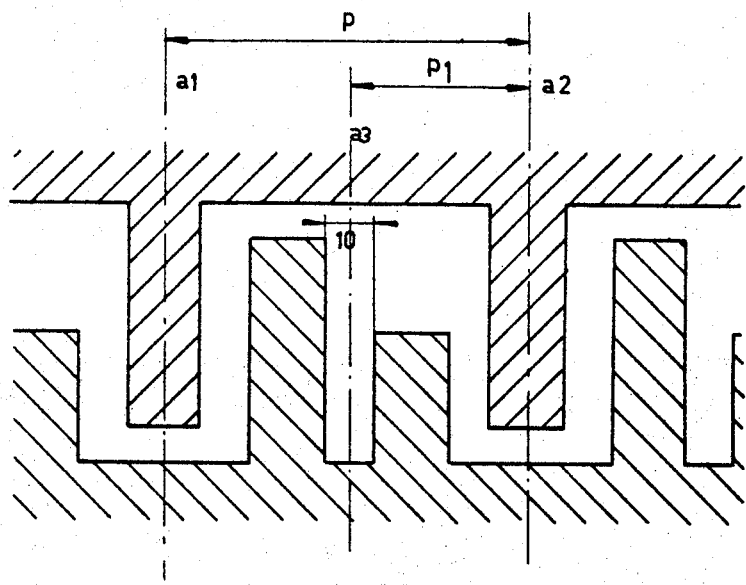
FIGURE 2 shows the stator podes in larger scale.
Figure 3:
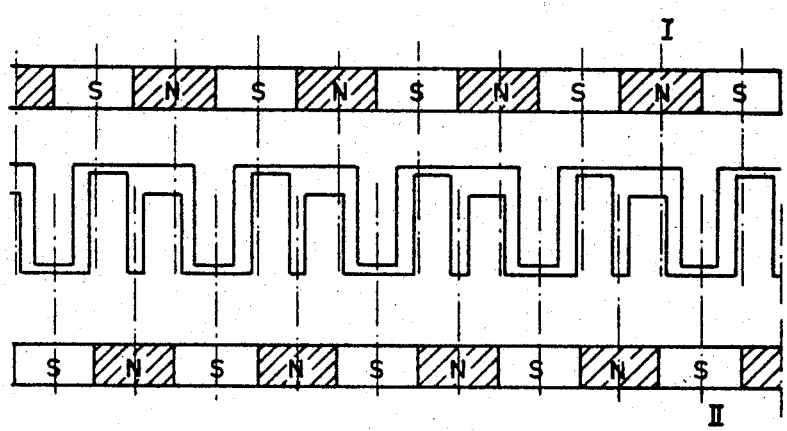
FIGURE 3 is a view of the stator and rotor poles, the latter having been shown in two positions I and II dephased one from the other by a quarter of a polar step.

FIGURE 2 of the drawing gives details of the arrangement of the poles in each stator piece and their interpenetration, while FIGURE 3 makes possible a more detailed analysis of the polar diagram and of the laws which determine the dimensions of the poles and their distribution.

If $p$ is the step or pitch separating two poles 9 of the flange 5, it is seen that axes $a_1$ and $a_2$ pass through the middle of these poles which have a similar plurality, for example north. Besides, axis $a_3$ corresponding to a half polar step $p_1$ does not pass through the middle of an opposite pole 7 and 8 but divides into two symmetrical parts the interval 10 separating poles 7 and 8 which are of reverse polarity, for example south.

All the poles have the same width whether they belong to flange 4 or flange 5. Additionally, the interval separating neighbouring poles of flange 4 is equal to the interval separating each pole of flange 5 and the adjacent poles of flange 4, these intervals being additionally greater than the radial distance comprised between the stator poles and the rotor.

As already indicated, each group of two poles of the same polarity has a difference in length between a pole 7 and a second pole 8.

This arrangement, in particular the uneven length and particular distribution of the poles, has for purpose to reduce vibrations to a minimum and to dampen the pulsating operation owing to the fact that they bring solutions to the well known problem in this type of motor of the obtaining of a perfect adaptation or synchronization between the rotor, where actions are at once mechanical (inertia) and magnetic, these last being very considerable owing to the high coercivity of the magnets used and the change in polarity in the stator masses, this characteristic persisting in the extreme limits of the voltage used, with or without load, and being obtained without any correction in the distribution of the poles relative to the theoretical data of a uniform polar division and from stator teeth which are perfectly symmetrical in their shape.

Such a motor is original since such advantages cannot be obtained up to now except by using flux dephasing rings generally made of copper and accordingly relatively expensive.

A synchronous motor made according to the above given indications can function regularly with voltages varying extensively, for example from 110 to 250 volts if the motor is designed for a nominal voltage of 220 volts and this without any vibration. Additionally, the power gain obtainable by the indicated formation of the poles and their distribution is considerable since for a same couple compared with a motor of conventional construction, the present motor is 25% lighter and less bulky.

What is claimed is:

1. Pulsating synchronous electric motor comprising a high coercivity permanently magnetized rotor having a plurality of poles and fitting on a shaft, said poles having axes at an interpolar distance between them, an energizing coil surrounding said rotor, a stator armature cage enclosing said rotor and coil, said armature cage comprising a pair of flanges, one of said flanges having a plurality of consecutive polar pairs, the poles being of different length in each pair, extending circularly around said rotor; said poles having an axis of symmetry; said other flange having a plurality of spaced consecutive poles, two poles of a given polarity of said second flange being disposed between two poles of opposite polarity on said first flange, the axis corresponding to said interpolar distance of said rotor passing through said axis of symmetry of said first flange and through the axes of intervals separating two consecutive poles of said second flange.

2. Motor according to claim 1, wherein the spaces separating the various poles have a width greater than the radial distance between said stator poles and said rotor.

3. Motor according to claim 1, wherein the poles of each group of two neighbouring poles of the same polarity have a different length from pole to pole, the length of one of the poles of each group being at least equal to the height of said rotor while that of the second pole being at least equal to half the height of said rotor.

4. Motor according to claim 1, wherein one of said flanges has a cylindrical skirt for surrounding said coil, said skirt having an opening and said other flange having on its periphery a series of legs fitting in said opening of said other flange.

References Cited

UNITED STATES PATENTS 3,181,020    4/1965    Welter _____ 310—164

J. D. MILLER, *Primary Examiner.*

L. L. SMITH, *Assistant Examiner.*